US012585144B2

(12) United States Patent
Ouyang et al.

(10) Patent No.: US 12,585,144 B2
(45) Date of Patent: Mar. 24, 2026

(54) PORTABLE MULTIMODAL LEARNING ANALYTICS SMART GLASSES

(71) Applicant: ZHEJIANG UNIVERSITY, Hangzhou (CN)

(72) Inventors: Fan Ouyang, Hangzhou (CN); Pengcheng Jiao, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 475 days.

(21) Appl. No.: 18/107,490

(22) Filed: Feb. 8, 2023

(65) Prior Publication Data

US 2023/0296923 A1     Sep. 21, 2023

Related U.S. Application Data

(63) Continuation of application No. PCT/CN2021/123942, filed on Oct. 14, 2021.

(30) Foreign Application Priority Data

Nov. 10, 2020     (CN) ........................ 202011247103.X

(51) Int. Cl.
*G02C 11/00* (2006.01)
*G02C 5/00* (2006.01)
(Continued)

(52) U.S. Cl.
CPC .............. *G02C 11/10* (2013.01); *G02C 5/001* (2013.01); *G06V 40/174* (2022.01); *G06V 40/18* (2022.01);
(Continued)

(58) Field of Classification Search
CPC ...... G02C 11/10; G02C 5/001; G06V 40/174; G06V 40/18; G06V 40/70; G09B 5/06; G09B 5/125; G10L 15/26
See application file for complete search history.

(56) References Cited

U.S. PATENT DOCUMENTS

2015/0317515 A1* 11/2015 Lake, II ................. A63B 71/06
                                                         700/91
2017/0156589 A1*  6/2017 Wu ........................... G09B 5/02

FOREIGN PATENT DOCUMENTS

CN       104730731 A  *  6/2015  ............. G02C 11/06
CN       105954878 A      9/2016
(Continued)

OTHER PUBLICATIONS

International Search Report (PCT/CN2021/123942); Date of Mailing: Jan. 14, 2022.
(Continued)

*Primary Examiner* — Bumsuk Won
*Assistant Examiner* — Ray Alexander Dean
(74) *Attorney, Agent, or Firm* — Wiersch Law Group

(57)     ABSTRACT

A portable multimodal learning analytics smart glasses, which can monitor, analyze and feedback the multimodal data, including expressions, voice, physiology, eye and head movements, and the data analysis result in real time during the learning process of the learner. The chip of the smart glasses integrates real-time data monitoring function, multimodal data analysis function and data visualization function. Through the data monitoring function, the variation conditions of expressions, voice, physiology, eyeball movement and head movements of the learning user during the learning process can be obtained in real time; through the multimodal data analysis function, the real-time acquired data is stored in the preset data structure for multimodal learning analysis; through the data visualization function, the processing result of data analysis is displayed to the learning user in the form of a visual graphic.

8 Claims, 4 Drawing Sheets

(51) Int. Cl.

| | |
|---|---|
| *G06V 40/16* | (2022.01) |
| *G06V 40/18* | (2022.01) |
| *G06V 40/70* | (2022.01) |
| *G09B 5/06* | (2006.01) |
| *G09B 5/12* | (2006.01) |
| *G10L 15/26* | (2006.01) |

(52) U.S. Cl.

CPC .............. *G06V 40/70* (2022.01); *G09B 5/06* (2013.01); *G09B 5/125* (2013.01); *G10L 15/26* (2013.01)

(56) References Cited

FOREIGN PATENT DOCUMENTS

| CN | 207380922 | U | | 5/2018 | |
|---|---|---|---|---|---|
| CN | 108319039 | A | * | 7/2018 | .............. G02C 5/12 |
| CN | 108594471 | A | | 9/2018 | |
| CN | 109407858 | A | | 3/2019 | |
| CN | 109902904 | A | | 6/2019 | |
| CN | 110251146 | A | | 9/2019 | |
| CN | 110807471 | A | | 2/2020 | |
| CN | 111709640 | A | | 9/2020 | |
| CN | 111736364 | A | | 10/2020 | |
| CN | 112419808 | A | | 2/2021 | |
| KR | 20160108092 | A | | 9/2016 | |
| WO | WO-2017061753 | A1 | * | 4/2017 | ............. G06Q 50/20 |

OTHER PUBLICATIONS

CN First Office Action(CN202011247103.X); Date of Mailing: Jun. 23, 2021.

CN Notice Of Allowance(CN202011247103.X); Date of Mailing: Sep. 28, 2021.

Learners' Discussion-Patterns, Perceptions, and Preferences-in-a-Chinese-Massive-Open-Online-Course.

\* cited by examiner

505

PORTABLE MULTIMODAL LEARNING ANALYTICS SMART GLASSES

CROSS-REFERENCE TO RELATED APPLICATIONS

The present application is a continuation of International Application No. PCT/CN2021/123942, filed on Oct. 14, 2021, which claims priority to Chinese Application No. 202011247103.X, filed on Nov. 10, 2020, the contents of both of which are incorporated herein by reference in their entireties.

TECHNICAL FIELD

The present disclosure relates to the technical field of online education and in particular, to a portable multimodal learning analytics smart glasses.

BACKGROUND

Learning analytics, an emerging subfield in pedagogy, has significantly influenced computer-supported learning and teaching. Learning analytics includes the measurement, collection, analysis and reporting of data of the learner and the learning environment thereof, the purpose of which is to understand and optimize the learning process and learning environment better. The research and application of multimodal learning analytics is one of the important branches in the field of learning analytics. For multimodal learning analytics needs to use various analysis methods and technical means to collect, analyze and mine the multimodal data (such as physiological indexes, voice, and micro expressions) generated by students in the learning process, and to report the data analysis result to users in a certain way to help them understand and master learning related information. The development and application of multimodal learning analytics, including multimodal data collection, data analysis, interpretation and presentation of result, is one of the main means to apply learning analytics to teaching practice to support and facilitate learning and teaching.

Based on the multimodal learning analytics method, researchers can assist learning and teaching processes by designing multimodal smart devices. With multimodal learning analytics, the data in the learning process of the learner can be obtained through such as sensors, and then the multimodal data can be modeled by artificial intelligence algorithms (such as machine learning), and finally the modal data result can be reasonably interpreted and visualized. In order to achieve the purpose, on the one hand, a learning analytics module needs to be established, and image acquisition peripherals and audio acquisition peripherals are used at the same time to monitor the dynamics of student users in the learning process in real time, on the other hand, the learning analytics method can be modeled by chip module program control, and at the same time, the innovatively designed learning analytics peripheral auxiliary tools are used to carry out more precise, optimized and pertinent dynamic monitoring process for micro expressions, physiological indexes and other factors of the student users in the learning process. At present, the relevant development of smart glasses or frames does not involve design and invention combined with intelligent learning analytics method: on the one hand, traditional computers cannot obtain personalized information for physical sign indexes of individual user; on the other hand, domestic research does not involve using glasses as a carrier for innovative design to assist intelligence learning analytics method. Therefore, the present disclosure provides a portable multimodal learning analytics smart glasses for real-time and accurate multimodal information acquisition, analysis and feedback, so as to realize the innovation of intelligent learning analytics.

Compared with the related art, the present disclosure innovatively designs a portable multimodal learning analytics smart glasses for capturing and analyzing the multimodal data of the students' learning process, so as to realize optimized dynamic monitoring and feedback by. Compared with the related art, the present disclosure is a student-centered, student-oriented multimodal learning analytics device, which can more directly provide students with opportunities to explore, understand and reflect on the learning process, so as to motivate students' learning autonomy, initiative and innovation. The multimodal portable device has advantages in the field of education, such as lag of the analysis and presentation of learning analytics result, failure of presenting the learning state and learning process in multiple dimensions, and the difficult for students to interpret the learning analytics result from multiple perspectives and get guidance for the next step of learning. Compared with the prior art, the portable multimodal learning analytics smart glasses dynamically read data from students' real-time learning process and analyze it through the data reading and analysis function, and finally show the data analysis result to students. Compared with the prior art, the portable multimodal learning analytics smart glasses obtain data in learner's learning process through sensors and other methods, establish an artificial intelligence algorithm modal to model multimodal data, and finally visually present the data analysis result to help students understand their dynamically changing learning state and process.

SUMMARY

Regarding the shortcomings of the prior art, the purpose of the present disclosure is to provide a portable multimodal learning analytics smart glasses.

The purpose of the present disclosure is achieved by: a portable multimodal learning analytics smart glasses, including a frame module, a smart screen module and a glasses carrier module, capturing and analyzing multimodal data generated by a learning user in real time with a multimodal learning analytics method, and feeding a visual analysis result back to a user.

The frame module includes a front compartment, a moving compartment and a rear compartment. An audio device and a chip module are provided at an outer side of the front compartment, and a gyroscope module inside is provided at an inner side of the front compartment. The audio device is configured for voice recognition to convert language data into text in real time with the audio device and monitor head movement through the gyroscope module. The chip module is configured for data analysis to read and analyze student data in real time and store the data in a preset data structure.

The moving compartment is provided with a base camera positioned vertically downward, a roller, a flexible screen, an outlet slot and a flexible screen guide rail, the base camera positioned vertically downward is configured to monitor eyeball movement and a facial expression, the roller is rotatably connected with the flexible screen, the flexible screen is connected with the frame module through the flexible screen guide rail, and the flexible screen is capable of sliding out of the outlet slot of the frame module along the flexible screen guide rail.

The smart glasses are configured to visualize a processing result of reading and analyzing the student data and feed the processing result back to a student through the flexible screen in various visual graphics.

The rear compartment is provided outside the frame module, the rear compartment is provided with a physiological index sensor configured to monitor a physiological index.

Further, the frame module, the smart screen module and the glasses carrier module are connected with each other through a circuit arranged in a frame, and the front compartment is provided with a chip module configured to process physical sign data collected in real time.

Further, a charging interface, a switch and a wireless transmitter are provided at the outer side of the front compartment, a micro laser limit switch, a micro gear, a chip module, a cable, a battery and a micro rack are provided at the outer side of the front compartment, and the charging interface, the switch, the wireless transmitter, the micro laser limit switch, the micro gear, the chip module, the cable, the battery and the micro rack are installed at the front compartment in sequence according to an order of a label. The battery is connected with the charging interface and the switch through the cable, and is configured to supply power to the whole glasses. The wireless transmitter is connected with the chip module. At the same time, the micro laser limit switch is connected with the micro gear, the micro gear is matched with the micro rack, the micro rack is connected with the moving compartment, and the micro laser limit switch is configured to constrain a front and a rear position limits of the moving compartment by scanning a movement of the moving compartment.

Further, the rear compartment is also provided with a gripper, a wireless earphone, an ear hook and a hanging ring. The gripper is configured to be gripped on a temple of the smart glasses and fixed on a wearer's ear through the ear hook and the hanging ring, and voice information is received through the wireless earphone.

Further, the audio device is configured to convert the language data into text by analyzing and encoding voice content by using such as natural language processing technology.

Further, the flexible screen is configured not only to assist vision in daily life, but also to display a processing result of the chip module in time to serve as a display screen.

Further, a voice recognition and analysis result is capable of extracting keywords by such as Jieba (Chinese for "to stutter") segmentation algorithms and displaying a conversation feature of a learner by a visual graphic such as keyword clustering. An analysis result of the head movement is capable of showing the learner's current movement, such as raising, lowering or turning the learner's head and feeding a relevant frequency back to the learner.

Further, the base camera is configured to recognize a facial expression and show a current psychological and emotional feature of the learner by an analysis result of the chip module, and further by text. A recognition and analysis result of the facial expression includes different psychological states of the learner, such as concentration, pleasure, and confusion. A result of the eyeball movement monitored by the base camera is capable of showing a learning object which is currently focused on by the learner, and feeding a result of attention duration, objects, eyeball movement times and so on back to the learner.

Further, the multimodal data includes multimodal type of data including an expression, voice, physiology, an eye and a head movement and other indexes.

Further, the physiological index such as heart rate and electrodermal index result is shown to the learner to display the learner's current physical features and conditions.

The beneficial effects of the present disclosure are as follows. The portable multimodal learning analytics smart glasses according to the present disclosure directly provide the learner with opportunities to explore, understand and reflect on the learning process and state, and can solve the problem that the existing learning analytics tools in the field of education, such as the learning analytics result lags behind, the learning process cannot be presented in multiple dimensions, and students find it difficult to interpret the learning analytics result and get guidance for the next step of learning. The technology utilizes the function of data reading and analysis to obtain the multimodal data of the learner in real time, automatically analyze data, and display data analysis result, so as to motivate the students' learning autonomy, initiative and innovation.

BRIEF DESCRIPTION OF DRAWINGS

In order to more clearly illustrate the technical solutions in the embodiments of the present disclosure or the prior art, the following will briefly introduce the drawings that need to be used in the description of the embodiments or the prior art. Obviously, the drawings in the following description are only some embodiments of the present disclosure. For those skilled in the art, other drawings can also be obtained from these drawings without creative work.

Figure 1:
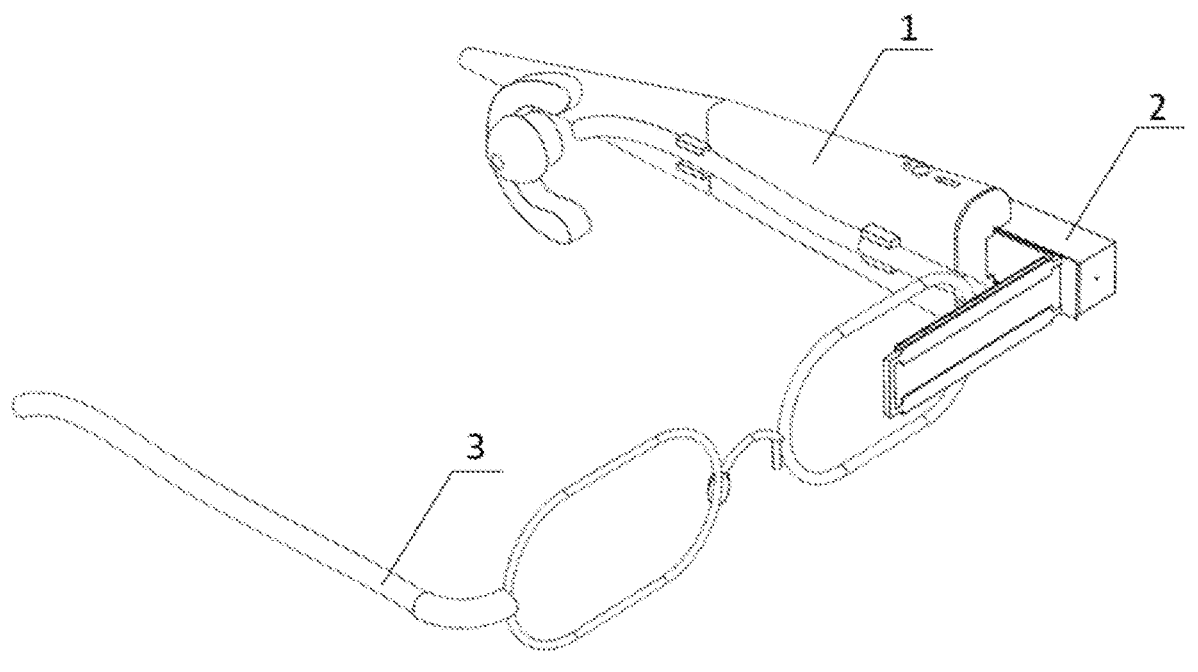
FIG. 1 is a structural schematic diagram of the present disclosure.
Figure 2:
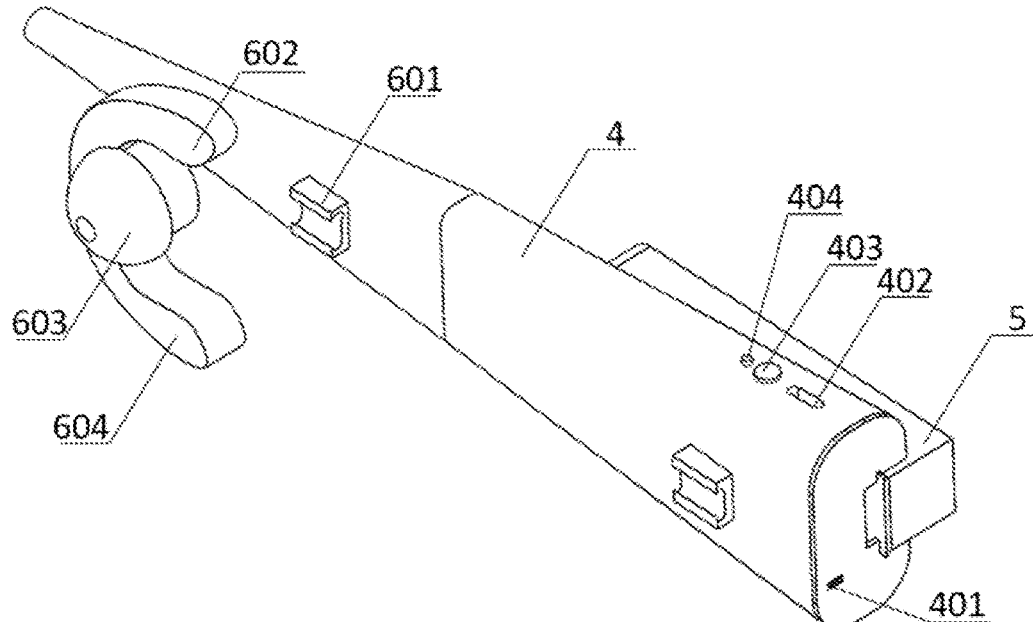
FIGS. 2 to 5 are schematic diagrams showing structural details of the present disclosure.
Figure 3:
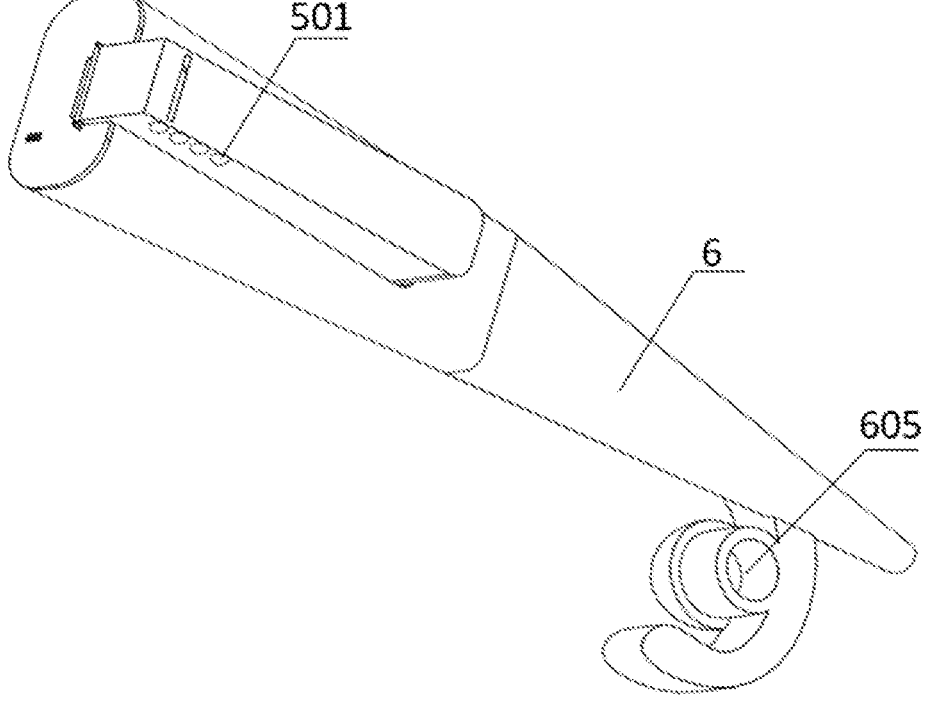
Figure 4:
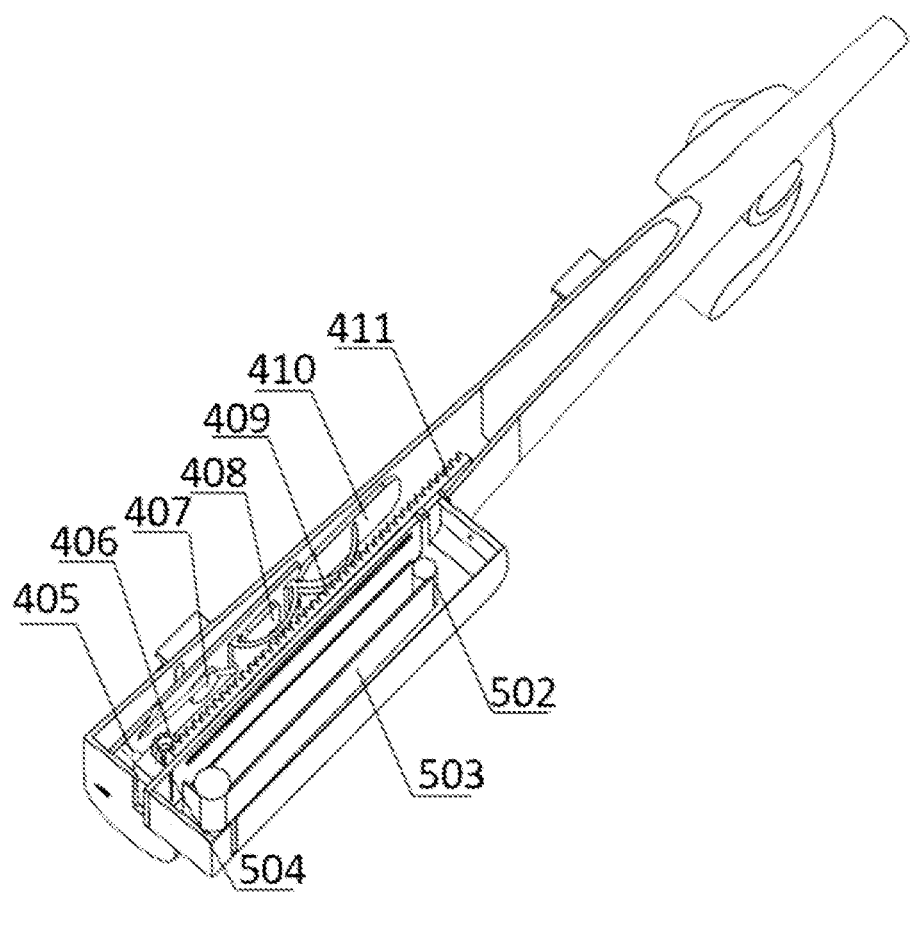
Figure 5:
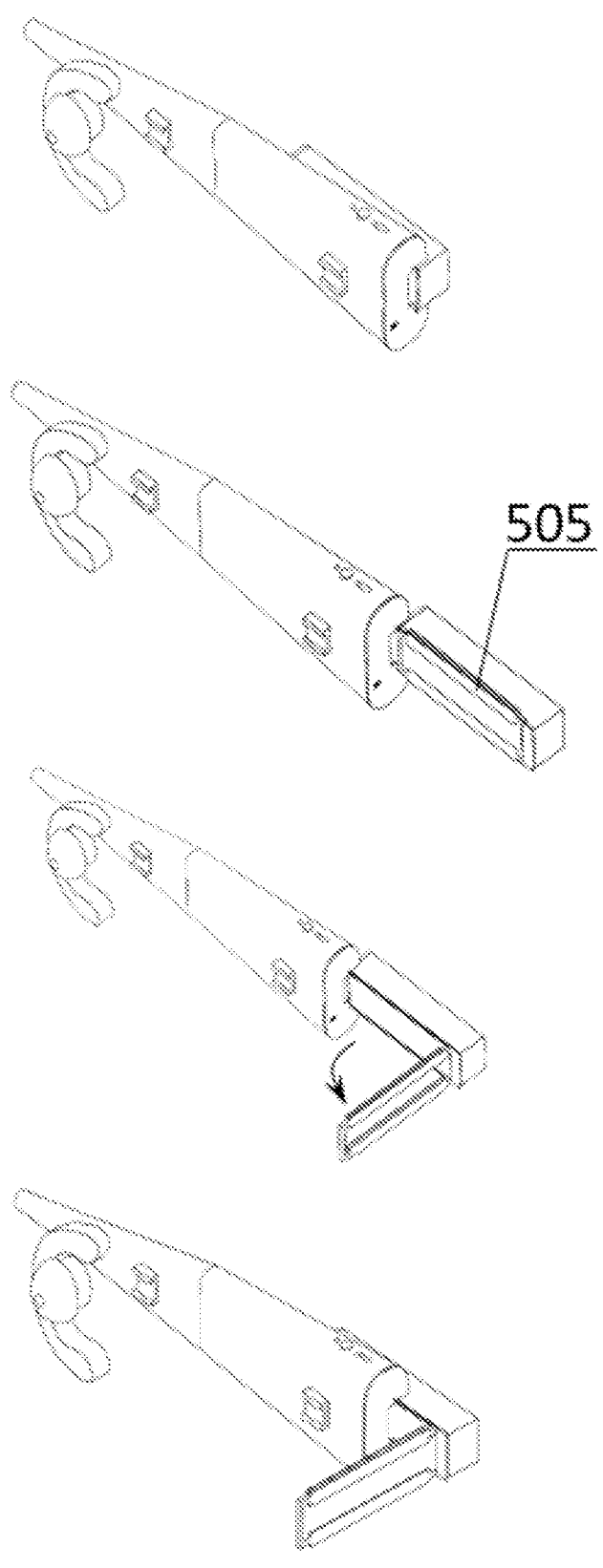

In the drawings, 1—frame module; 2—smart screen module; 3—glasses carrier module; 4—front compartment; 401—audio device; 402—charging interface; 403—switch; 404—wireless transmitter; 405—micro laser limit switch; 406—micro gear; 407—gyroscope module; 408—chip module; 409—cable; 410—battery; 411—micro rack; 5—moving compartment; 501—base camera positioned vertically downward; 502—roller; 503—flexible screen; 504—outlet slot; 505—flexible screen guide rail; 6—rear compartment; 601—gripper; 602—physiological index sensor; 603—wireless earphone; 604—ear hook; 605—hanging ring.

DESCRIPTION OF EMBODIMENTS

The technical solutions in the embodiments of the present disclosure will be clearly and completely described below with reference to the drawings in the embodiments of the present disclosure. Obviously, the described embodiments are only some, but not all, embodiments of the present disclosure. Based on the embodiments of the present disclosure, all other embodiments obtained by those skilled in the art without creative effort fall within the protection scope of the present disclosure.

As shown in FIG. 1, the present disclosure provides a portable multimodal learning analytics smart glasses. The smart glasses comprise a frame module 1, a smart screen module 2, and a glasses carrier module 3. The frame module 1, the smart screen module 2 and the glasses carrier module 3 are connected through a circuit arranged in the frame, and capture and analyze the multimodal data generated by a learning user in real time with the multimodal learning analytics method, and feed a visual analysis result back to the user. The multimodal data includes multimodal type of data including an expression, voice, physiology, an eye and head movement and other indexes.

As shown in FIGS. 2-5, the frame module 1 includes a front compartment 4, a moving compartment 5 and a rear compartment 6. An audio device 401 and a chip module 408 outside are provided at an outer side of the front compartment, and a gyroscope module 407 inside is provided at an inner side of the front compartment. The audio device 401 is configured for voice recognition to convert the language data into text in real time through the audio device 401 and monitor the head movement by the gyroscope module 407. The chip module 408 is configured for data analysis to process the physical sign data collected in real time, analyze the data, and store the data in a preset data structure.

The audio device 401 converts the language data into text in real time by analyzing and encoding the voice content by using technologies such as natural language processing.

The voice recognition and analysis result may extract keywords by algorithms such as Jieba (Chinese for "to stutter") segmentation. The learner's conversation feature can be shown by means of a visual graphic such as keyword clustering.

The head movement analysis result may show the learner's current movements such as raising, lowering or turning his/her head, and feed the relevant frequency back to the learner.

The moving compartment 5 is provided with a base camera 501 positioned vertically downward, a roller 502, a flexible screen 503, an outlet slot 504 and a flexible screen guide rail 505. The function of monitoring eyeball movement and facial expressions was realized through the base camera 501 positioned vertically downward. The roller 502 is rotatably connected with the flexible screen 503, the flexible screen 503 is connected with the frame module 1 through the flexible screen guide rail 505, and the flexible screen 503 can slide out of the outlet slot 504 of the frame module 1 along the flexible screen guide rail 505.

The base camera 501 recognized the facial expressions and show the current psychological and emotional features of the learner by the analysis result of the chip module 408, and further by text. The recognition and analysis result of the facial expressions includes different psychological states of the learner, such as concentration, pleasure, confusion. The eyeball movement result monitored by the base camera 501 may show the learning object that currently focused on by the learner, and feed the result of attention duration, objects, eyeball movement times and so on back to the learner.

The flexible screen 503 may be configured not only to assist vision in daily life, but also to display the processing result of the chip module 408 in time to realize the function of the display screen.

The smart glasses visualized the processing result of data reading and analysis function, and feed the result back to students by the flexible screen 503 in various visual graphics.

The rear compartment 6 is arranged outside the frame module 1, and a physiological index sensor 602 is installed at the rear compartment 6. Physiological indexes were monitored by the physiological index sensor 602. The physiological indexes such as heart rate and electrodermal index result were shown to the learner to show his/her current physical features and conditions.

A charging interface 402, a switch 403 and a wireless transmitter 404 are provided at the outer side of the front compartment 4, a micro laser limit switch 405, a micro gear 406, a chip module 408, a cable 409, a battery 410 and a micro rack 411 are provided at the inner side of the front compartmen4 4, and the above components are installed on the front compartment 4 in sequence according to the order of labels. The battery 410 is connected with the charging interface 402 and the switch 403 through the cable 409, and supplies power to the whole glasses. The wireless transmitter 404 is connected with the chip module 408. At the same time, the micro laser limit switch 405 is connected with the micro gear 406, the micro gear 406 is matched with the micro rack 411, the micro rack 411 is connected with the moving compartment 5, and the micro laser limit switch 405 constrained the front and rear position limits of the moving compartment 5 by scanning the movement of the moving compartment 5.

The rear compartment 6 is further provided with a gripper 601, a wireless earphone 603, an ear hook 604 and a hanging ring 605. The gripper 601 was gripped on a temple of the smart glasses and fixed on a wearer's ear through the ear hook 604 and the hanging ring 605, and voice information was received through the wireless earphone 603.

Taking FIGS. 1-5 as examples to explain an operation method of portable multimodal learning analytics smart glasses. First, the glasses were charged by being connected with an external power source through the charging interface 402, and the electrical energy is stored in the battery 410 for the dynamic monitoring process of the frame module and the smart screen module. The audio device 401 converted language data into text in real time, and then analyzes, encodes, and performs topic modeling and clustering to the text content by technologies such as natural language processing, so as to study the thought process of students. The face showed the psychological state through expressions, and the eyeball movement may reflect the learner's gaze target and duration. The base camera 501 positioned vertically downward may realize the function of monitoring eyeball movement and facial expressions by capturing the subtle motions of the face. The gyroscope is an angular motion detection device that uses a momentum-moment-sensitive shell of a high-speed axisymmetric body to revolve around one or two axes orthogonal to the rotation axis relative to the inertial space. The head movements of the learner may be accurately monitored by the gyroscope module 407. The physiological index sensor 602 may measure various physiological indexes including pulse, heartbeat, etc. through an internal sensor, and may obtain a blood pressure value by analyzing the corresponding electrical signals generated by the pulse of the artery, and is thereby suitable for long-term continuous monitoring. The data were transmitted by the wireless transmitter 404. The wireless earphone 603 can be used to receive feedback information in real time. It should be noted that the design is a learning assistant tool based on multimodal learning analytics technology, and is a supplementary tool applied for the learning analytics technology, but the learning analytics technology and the application thereof are not limited to such a type of tool.

It should be illustrated that, in the present disclosure, relational terms such as first and second are only used to distinguish one entity or operation from another entity or operation, and do not necessarily require or imply any actual relationship or order existed between these entities or operations. Moreover, the terms "include", "comprise" or any other variation thereof are intended to cover non-exclusive inclusion, so that the process, method, item or device including a series of elements include not only those elements, but also other elements not explicitly listed, or elements inherent to such the process, method, item or device. Without further limitation, the elements defined by the sentence "includes a . . . " do not exclude the existence of other identical elements in the process, method, item or device including the elements.

The above embodiments are only used to illustrate the technical solutions of the present disclosure, but not to limit them. Although the present disclosure has been described in detail with reference to the above embodiments, those skilled in the art should understand that the technical solutions recorded in the above embodiments can still be modified, or some or all technical features thereof can be equivalently replaced. Whereas the modifications or replacements do not make the essence of the corresponding technical solutions depart from the scope of the technical solutions in the embodiments of the present disclosure.

What is claimed is:

1. A portable multimodal learning analytics smart glasses, comprising a frame module, a smart screen module and a glasses carrier module, wherein the glasses are configured to capture and analyze multimodal data generated by a learning user in real time with a multimodal learning analytics method, and feed a visual analysis result back to the learning user;

wherein the frame module comprises a front compartment, a moving compartment and a rear compartment; an audio device and a chip module is provided at an outer side of the front compartment, and a gyroscope module is provided at an inner side of the front compartment; the audio device is configured for voice recognition to convert language data into text in real time through the audio device and monitor head movement through the gyroscope module; and the chip module is configured for data analysis to read and analyze student data in real time and to store the student data in a preset data structure;

wherein a charging interface, a switch and a wireless transmitter are provided at the outer side of the front compartment, a micro laser limit switch, a micro gear, a chip module, a cable, a battery and a micro rack are provided at the inner side of the front compartment, and the micro laser limit switch, the micro gear, the chip module, the cable, the battery and the micro rack are provided at the front compartment in sequence; the battery is connected with the charging interface and the switch through the cable, and supplies power to the whole glasses, and the wireless transmitter is connected with the chip module; the micro laser limit switch is connected with the micro gear, the micro gear is matched with the micro rack, the micro rack is connected with the moving compartment, and the micro laser limit switch is configured to constrain front and rear position limits of the moving compartment by scanning movement of the moving compartment;

wherein the moving compartment is provided with a base camera positioned vertically downward, a roller, a flexible screen, an outlet slot and a flexible screen guide rail; wherein the base camera is configured to monitor eyeball movement and a facial expression; the roller is rotatably connected with the flexible screen, the flexible screen is connected with the frame module through the flexible screen guide rail, and the flexible screen is capable of sliding out of the outlet slot of the frame module along the flexible screen guide rail;

wherein the smart glasses are configured to visualize a processing result of data reading and analyzing and feed the processing result back to a student by the flexible screen through multiple visual graphics; wherein a voice recognition and analysis result is capable of extracting a keyword by stutter segmentation algorithm and showing a conversation feature of a learner through a visual graphic of keyword clustering, the head movement analysis result is capable of showing current head raising, head lowering or head turning movements of the learner and feeding a relevant frequency back to the learner; and wherein the rear compartment is provided outside the frame module, and provided with a physiological index sensor, and the physiological index sensor is configured to monitor a physiological index.

2. The portable multimodal learning analytics smart glasses according to claim 1, wherein the frame module, the smart screen module and the glasses carrier module are connected with each other through a circuit arranged in a frame, and the chip module is arranged in the front compartment to process physical sign data collected in real time.

3. The portable multimodal learning analytics smart glasses according to claim 1, wherein the rear compartment is further provided with a gripper, a wireless earphone, an ear hook and a hanging ring, the gripper is gripped on a temple of the smart glasses and fixed to an ear of a wearer through the ear hook and the hanging ring, and wherein voice information is received by the wireless earphone.

4. The portable multimodal learning analytics smart glasses according to claim 1, wherein the audio device is configured to convert language data into text in real time by analyzing and encoding voice content through natural language processing.

5. The portable multimodal learning analytics smart glasses according to claim 1, wherein the flexible screen is configured to assist vision in daily life and display a processing result of the chip module in time to serve as a display screen.

6. The portable multimodal learning analytics smart glasses according to claim 1, wherein the base camera is configured to recognize a facial expression and, by an analysis result of the chip module, show current psychological and emotional features of the learner through text; a recognition and analysis result of the facial expressions comprises psychological states of concentration, pleasure, and confusion of the learner; and eyeball movement result monitored by the base camera is capable of showing a learning object currently focused on by the learner, and feedback a result of attention duration, objects, eyeball movement times to the learner.

7. The portable multimodal learning analytics smart glasses according to claim 1, wherein the multimodal data comprises multimodal type of data including an index of an expression, voice, physiology, eyeball movement and head movement.

8. The portable multimodal learning analytics smart glasses according to claim 1, wherein a result of the physiological index is shown to the learner to display current physical features and conditions of the learner, and the physiological index comprises a heart rate and an electrodermal index.

* * * * *